(12) United States Patent
Waas et al.

(10) Patent No.: US 11,588,883 B2
(45) Date of Patent: *Feb. 21, 2023

(54) METHOD AND SYSTEM FOR WORKLOAD MANAGEMENT FOR DATA MANAGEMENT SYSTEMS

(71) Applicant: Datometry, Inc., San Francisco, CA (US)

(72) Inventors: Florian Michael Waas, San Francisco, CA (US); Mohamed Soliman, Foster City, CA (US); Zhongxian Gu, Sunnyvale, CA (US); Lyublena Rosenova Antova, Sunnyvale, CA (US); Tuan Anh Cao, San Francisco, CA (US); Entong Shen, Foster City, CA (US); Michael Alexander Duller, San Francisco, CA (US)

(73) Assignee: DATOMETRY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,195

(22) Filed: Nov. 22, 2019

(65) Prior Publication Data

US 2020/0169600 A1 May 28, 2020

Related U.S. Application Data

(63) Continuation of application No. 15/250,887, filed on Aug. 29, 2016, now Pat. No. 10,594,779.

(Continued)

(51) Int. Cl.
*H04L 67/1001* (2022.01)
*H04L 47/70* (2022.01)
*H04L 67/141* (2022.01)

(52) U.S. Cl.
CPC .......... *H04L 67/1001* (2022.05); *H04L 47/70* (2013.01); *H04L 67/141* (2013.01)

(58) Field of Classification Search
CPC ..... H04L 67/42; H04L 67/104; H04L 67/141; H04L 67/1002; H04L 47/70;
(Continued)

(56) References Cited

U.S. PATENT DOCUMENTS

| | | | |
|---|---|---|---|
| 5,970,490 | A | 10/1999 | Morgenstern |
| 6,108,649 | A | 8/2000 | Young et al. |

(Continued)

FOREIGN PATENT DOCUMENTS

| | | |
|---|---|---|
| CN | 107122361 A | 9/2017 |
| WO | 2007121571 A1 | 11/2007 |

OTHER PUBLICATIONS

U. Hohenstein, M. C. Jaeger and M. Bluemel, "Improving Connection Pooling Persistence Systems," 2009 First International Conference on Intensive Applications and Services, 2009, pp. 71-77, doi: 10.1109/Intensive.2009.18. (Year: 2009).*

(Continued)

*Primary Examiner* — James N Fiorillo
(74) *Attorney, Agent, or Firm* — Adeli LLP

(57) ABSTRACT

A system for controlling access to a downstream database management system (DMS) is provided. The system comprises an interface to maintain client connections with a plurality of upstream clients; a pooling component to establish a dynamic pool, and to selectively route each client connection to a pool; within each pool maintaining a queue comprising client database requests associated with particular client connections; and selectively granting access to the client database requests within each queue to at least one downstream DMS.

18 Claims, 5 Drawing Sheets

Related U.S. Application Data

(60) Provisional application No. 62/210,896, filed on Aug. 27, 2015.

(58) Field of Classification Search
CPC ... H04L 47/125; H04L 65/1069; H04L 29/08; H04L 12/911; G06F 9/5027; G06F 9/5083; G06F 11/16; G06F 9/5011; G06F 17/00; G06F 17/30442; H04N 21/23103; H04W 28/08; H04J 14/0227
USPC .................................................. 709/200
See application file for complete search history.

(56) References Cited

U.S. PATENT DOCUMENTS

| | | | |
|---|---|---|---|
| 6,704,747 B1 | 3/2004 | Fong | |
| 6,889,227 B1 | 5/2005 | Hamilton | |
| 7,123,608 B1* | 10/2006 | Scott | H04L 67/30 370/353 |
| 7,146,376 B2 | 12/2006 | Dettinger et al. | |
| 7,203,678 B1 | 4/2007 | Petropoulos et al. | |
| 7,263,590 B1 | 8/2007 | Todd et al. | |
| 7,346,635 B2 | 3/2008 | Whitten et al. | |
| 7,359,916 B2 | 4/2008 | Werner | |
| 7,480,661 B2 | 1/2009 | Seefeldt et al. | |
| 7,620,665 B1 | 11/2009 | George et al. | |
| 7,664,795 B2 | 2/2010 | Balin et al. | |
| 7,693,913 B2 | 4/2010 | Goto | |
| 7,805,583 B1 | 9/2010 | Todd et al. | |
| 7,877,397 B2 | 1/2011 | Nagarajan et al. | |
| 7,885,968 B1 | 2/2011 | Hamamatsu et al. | |
| 7,904,487 B2 | 3/2011 | Ghatare | |
| 8,015,233 B2* | 9/2011 | Li | H04L 61/4552 709/201 |
| 8,250,027 B2 | 8/2012 | Fujiyama et al. | |
| 8,275,810 B2 | 9/2012 | Barton | |
| 8,429,601 B2 | 4/2013 | Andersen | |
| 8,447,774 B1 | 5/2013 | Robie et al. | |
| 8,533,177 B2 | 9/2013 | Huck et al. | |
| 8,612,468 B2 | 12/2013 | Schloming | |
| 8,631,034 B1 | 1/2014 | Peloski | |
| 8,793,797 B2 | 7/2014 | Meenakshisundaram | |
| 8,874,609 B1* | 10/2014 | Singh | G06F 16/2453 707/770 |
| 8,898,126 B1* | 11/2014 | Dai | G06F 16/2308 707/703 |
| 8,918,416 B1 | 12/2014 | Gross et al. | |
| 8,943,181 B2* | 1/2015 | Kasten | H04L 67/1021 709/219 |
| 8,972,433 B2 | 3/2015 | McLean et al. | |
| 8,996,555 B2 | 3/2015 | Kuchmann-Beauger et al. | |
| 9,075,811 B2 | 7/2015 | Nayyar et al. | |
| 9,158,827 B1 | 10/2015 | Vu et al. | |
| 9,201,606 B1 | 12/2015 | Taylor et al. | |
| 9,208,032 B1* | 12/2015 | McAlister | G06F 11/1471 |
| 9,305,070 B2 | 4/2016 | Zhu et al. | |
| 9,582,539 B1 | 2/2017 | Cole et al. | |
| 9,639,572 B2 | 5/2017 | Hutzel et al. | |
| 9,665,619 B1 | 5/2017 | Cole et al. | |
| 9,697,484 B1 | 7/2017 | Mohen et al. | |
| 9,785,645 B1 | 10/2017 | Chen et al. | |
| 9,811,527 B1 | 11/2017 | Esposito et al. | |
| 10,108,914 B2 | 10/2018 | Mohen et al. | |
| 10,120,920 B2 | 11/2018 | Alva et al. | |
| 10,162,729 B1 | 12/2018 | Snyder et al. | |
| 10,241,960 B2 | 3/2019 | Kent, IV et al. | |
| 10,255,336 B2 | 4/2019 | Waas et al. | |
| 10,261,956 B2 | 4/2019 | Jugel et al. | |
| 10,445,334 B1 | 10/2019 | Xiao et al. | |
| 10,585,887 B2 | 3/2020 | Tran et al. | |
| 10,594,779 B2 | 3/2020 | Waas et al. | |
| 10,599,664 B2 | 3/2020 | Agrawal et al. | |
| 10,614,048 B2 | 4/2020 | Fuglsang et al. | |
| 10,628,438 B2 | 4/2020 | Waas et al. | |
| 10,649,965 B2 | 5/2020 | Barbas et al. | |
| 10,649,989 B2 | 5/2020 | Lereya et al. | |
| 10,762,100 B2 | 9/2020 | Waas et al. | |
| 10,762,435 B2* | 9/2020 | Yang | H04L 43/0876 |
| 10,769,200 B1 | 9/2020 | Lin | |
| 10,783,124 B2 | 9/2020 | Barbas et al. | |
| 10,824,641 B1 | 11/2020 | Plenderleith | |
| 10,846,284 B1 | 11/2020 | Park et al. | |
| 11,016,954 B1 | 5/2021 | Babocichin et al. | |
| 11,204,898 B1 | 12/2021 | Waas et al. | |
| 11,269,824 B1 | 3/2022 | Waas et al. | |
| 11,294,869 B1 | 4/2022 | Waas et al. | |
| 11,294,870 B1 | 4/2022 | Waas et al. | |
| 11,403,282 B1 | 8/2022 | Waas et al. | |
| 11,403,291 B1 | 8/2022 | Waas et al. | |
| 11,422,986 B1 | 8/2022 | Waas et al. | |
| 11,436,213 B1 | 9/2022 | Waas et al. | |
| 2001/0034733 A1 | 10/2001 | Prompt et al. | |
| 2002/0004796 A1* | 1/2002 | Vange | G06F 9/5027 |
| 2002/0087587 A1 | 7/2002 | Vos et al. | |
| 2002/0133504 A1 | 9/2002 | Mahos et al. | |
| 2002/0161907 A1 | 10/2002 | Moon | |
| 2003/0126156 A1 | 7/2003 | Stoltenberg et al. | |
| 2003/0184793 A1 | 10/2003 | Pineau | |
| 2004/0122953 A1* | 6/2004 | Kalmuk | G06F 16/2308 709/227 |
| 2004/0139061 A1 | 7/2004 | Colossi et al. | |
| 2004/0215629 A1 | 10/2004 | Dettinger et al. | |
| 2005/0038781 A1 | 2/2005 | Ferrari et al. | |
| 2005/0080914 A1 | 4/2005 | Lerner et al. | |
| 2005/0234889 A1 | 10/2005 | Fox et al. | |
| 2006/0026179 A1 | 2/2006 | Brown et al. | |
| 2006/0136448 A1 | 6/2006 | Cialini et al. | |
| 2006/0167896 A1 | 7/2006 | Kapur et al. | |
| 2006/0242297 A1* | 10/2006 | Aronoff | H04L 67/1029 709/225 |
| 2007/0027905 A1 | 2/2007 | Warren et al. | |
| 2007/0061266 A1* | 3/2007 | Moore | G06Q 50/00 705/51 |
| 2007/0136311 A1* | 6/2007 | Kasten | H04L 67/14 |
| 2007/0219959 A1 | 9/2007 | Kanemasa | |
| 2007/0239774 A1 | 10/2007 | Bodily et al. | |
| 2007/0283144 A1 | 12/2007 | Kramer et al. | |
| 2008/0281784 A1 | 11/2008 | Zane et al. | |
| 2009/0024622 A1 | 1/2009 | Chkodrov et al. | |
| 2009/0059785 A1* | 3/2009 | Jogalekar | H04L 47/10 370/230 |
| 2009/0132503 A1 | 5/2009 | Sun et al. | |
| 2009/0150367 A1 | 6/2009 | Melnik et al. | |
| 2009/0240711 A1 | 9/2009 | Levin | |
| 2009/0319498 A1 | 12/2009 | Zabokritski et al. | |
| 2010/0023481 A1 | 1/2010 | McGoveran | |
| 2010/0082646 A1 | 4/2010 | Meek et al. | |
| 2010/0094838 A1 | 4/2010 | Kozak | |
| 2010/0169377 A1 | 7/2010 | Galeazzi et al. | |
| 2010/0169381 A1 | 7/2010 | Faunce et al. | |
| 2011/0010379 A1 | 1/2011 | Gilderman et al. | |
| 2011/0055231 A1 | 3/2011 | Huck et al. | |
| 2011/0154461 A1* | 6/2011 | Anderson | H04L 63/0227 726/7 |
| 2011/0191343 A1 | 8/2011 | Heaton et al. | |
| 2011/0276623 A1* | 11/2011 | Girbal | G06F 16/172 709/219 |
| 2011/0283045 A1* | 11/2011 | Krishnan | G06F 9/544 711/E12.008 |
| 2011/0320444 A1 | 12/2011 | Yehaskel et al. | |
| 2012/0005148 A1 | 1/2012 | Horvitz et al. | |
| 2012/0036146 A1* | 2/2012 | Annapragada | G06F 16/27 707/E17.014 |
| 2012/0102022 A1 | 4/2012 | Miranker et al. | |
| 2012/0131567 A1 | 5/2012 | Barros et al. | |
| 2012/0158650 A1* | 6/2012 | Andre | G06F 16/24539 707/613 |
| 2012/0179677 A1* | 7/2012 | Roselli | G06Q 10/10 707/736 |
| 2012/0221817 A1 | 8/2012 | Yueh | |
| 2012/0296942 A1 | 11/2012 | Arora et al. | |
| 2012/0303913 A1 | 11/2012 | Kathmann et al. | |

(56) References Cited

U.S. PATENT DOCUMENTS

| | | |
|---|---|---|
| 2012/0304179 A1 | 11/2012 | Devarakonda et al. |
| 2013/0066948 A1* | 3/2013 | Colrain .............. H04L 67/146 709/203 |
| 2013/0085989 A1 | 4/2013 | Nayyar et al. |
| 2013/0163737 A1 | 6/2013 | Dement et al. |
| 2013/0179476 A1 | 7/2013 | Saam et al. |
| 2013/0262425 A1 | 10/2013 | Shamlin et al. |
| 2013/0311729 A1* | 11/2013 | Navarro ............. G06F 11/3409 711/154 |
| 2013/0325927 A1 | 12/2013 | Corbett et al. |
| 2014/0095534 A1 | 4/2014 | Aingaran et al. |
| 2014/0136516 A1 | 5/2014 | Clifford et al. |
| 2014/0143011 A1 | 5/2014 | Mudugu et al. |
| 2014/0195514 A1 | 7/2014 | Stein |
| 2014/0244610 A1 | 8/2014 | Raman et al. |
| 2014/0280286 A1 | 9/2014 | Ganti et al. |
| 2014/0325096 A1* | 10/2014 | Jung .................... G06F 13/126 710/16 |
| 2014/0358972 A1* | 12/2014 | Guarrieri ............... G06F 16/21 707/781 |
| 2014/0359129 A1 | 12/2014 | Sharma et al. |
| 2015/0019488 A1 | 1/2015 | Higginson et al. |
| 2015/0095381 A1 | 4/2015 | Chen et al. |
| 2015/0172206 A1* | 6/2015 | Anderson ........... G06F 11/0793 709/226 |
| 2015/0248404 A1 | 9/2015 | Pazdziora et al. |
| 2015/0269223 A1 | 9/2015 | Miranker et al. |
| 2015/0310057 A1 | 10/2015 | Fu et al. |
| 2015/0331946 A1* | 11/2015 | Balwani ................ G16H 10/40 707/769 |
| 2015/0339361 A1 | 11/2015 | Kumar et al. |
| 2015/0347585 A1 | 12/2015 | Klotz |
| 2015/0363396 A1 | 12/2015 | Sengupta et al. |
| 2016/0127325 A1 | 5/2016 | Odenheimer et al. |
| 2016/0188710 A1 | 6/2016 | Naik |
| 2016/0203054 A1* | 7/2016 | Zhang ................. G06F 11/1469 707/645 |
| 2016/0261576 A1* | 9/2016 | Nivala .................... H04L 63/10 |
| 2016/0292164 A1 | 10/2016 | Kedia et al. |
| 2016/0292167 A1 | 10/2016 | Tran et al. |
| 2016/0308941 A1 | 10/2016 | Cooley |
| 2016/0321097 A1* | 11/2016 | Zhu ..................... G06F 9/45558 |
| 2016/0328442 A1 | 11/2016 | Waas et al. |
| 2016/0335361 A1 | 11/2016 | Teodorescu et al. |
| 2017/0011104 A1 | 1/2017 | Hyde et al. |
| 2017/0017685 A1 | 1/2017 | Das et al. |
| 2017/0034095 A1* | 2/2017 | Kamalakantha ........ H04L 12/40 |
| 2017/0063936 A1 | 3/2017 | Waas et al. |
| 2017/0116207 A1 | 4/2017 | Lee et al. |
| 2017/0116249 A1 | 4/2017 | Ravipati et al. |
| 2017/0116260 A1 | 4/2017 | Chattopadhyay |
| 2017/0116274 A1 | 4/2017 | Weissman et al. |
| 2017/0116298 A1 | 4/2017 | Ravipati et al. |
| 2017/0124146 A1 | 5/2017 | Lereya et al. |
| 2017/0147656 A1 | 5/2017 | Choudhary et al. |
| 2017/0177650 A1 | 6/2017 | Devine et al. |
| 2017/0235790 A1 | 8/2017 | Bruso et al. |
| 2017/0249353 A1* | 8/2017 | van Gulik ............. G06F 16/252 |
| 2017/0262777 A1 | 9/2017 | Mohen et al. |
| 2017/0364694 A1 | 12/2017 | Jacob et al. |
| 2017/0373935 A1 | 12/2017 | Subramanian et al. |
| 2018/0081946 A1 | 3/2018 | Bondalapati et al. |
| 2018/0121433 A1 | 5/2018 | Nevrekar et al. |
| 2018/0144001 A1 | 5/2018 | Lai et al. |
| 2018/0150361 A1 | 5/2018 | Khandelwal |
| 2018/0173775 A1 | 6/2018 | Li et al. |
| 2018/0218030 A1 | 8/2018 | Wong et al. |
| 2018/0234327 A1 | 8/2018 | Kono |
| 2018/0246886 A1 | 8/2018 | Dragomirescu et al. |
| 2018/0285475 A1 | 10/2018 | Grover et al. |
| 2018/0292995 A1 | 10/2018 | Tal et al. |
| 2018/0329916 A1 | 11/2018 | Waas et al. |
| 2018/0336258 A1 | 11/2018 | Lee et al. |
| 2018/0357291 A1* | 12/2018 | Choi ....................... G06F 16/25 |
| 2019/0065536 A1 | 2/2019 | Becker et al. |
| 2019/0095241 A1 | 3/2019 | Ago et al. |
| 2019/0138402 A1 | 5/2019 | Bikumala et al. |
| 2019/0155805 A1 | 5/2019 | Kent, IV et al. |
| 2019/0294763 A1 | 9/2019 | Coatrieux et al. |
| 2019/0303379 A1 | 10/2019 | Waas et al. |
| 2019/0311057 A1 | 10/2019 | Sung et al. |
| 2019/0327154 A1 | 10/2019 | Sahoo et al. |
| 2019/0392067 A1 | 12/2019 | Sonawane et al. |
| 2020/0104375 A1 | 4/2020 | Earnesty, Jr. et al. |
| 2020/0104376 A1 | 4/2020 | Earnesty, Jr. et al. |
| 2020/0104377 A1 | 4/2020 | Earnesty, Jr. et al. |
| 2020/0125582 A1 | 4/2020 | O'Shaughnessy |
| 2020/0167323 A1 | 5/2020 | Swamy et al. |
| 2020/0183929 A1 | 6/2020 | Lee et al. |
| 2020/0201860 A1 | 6/2020 | Vogelsgesang et al. |
| 2020/0250179 A1 | 8/2020 | Agrawal et al. |
| 2020/0278966 A1 | 9/2020 | Al-Omari et al. |
| 2021/0034636 A1 | 2/2021 | Waas et al. |

OTHER PUBLICATIONS

Aleyasen, A., et al., "High-Throughput Adaptive Data Virtualization via Context-Aware Query Routing," 2018 IEEE International Conference on Big Data, Dec. 10-13, 2018, 10 pages, Seattle, WA, USA.

Antova, Lyublena, et al., "Rapid Adoption of Cloud Data Warehouse Technology Using Datometry Hyper-Q," Month Unknown, 2017, 12 pages, Datometry, Inc.

Author Unknown, "AWS Database Migration Service," Month Unknown, 2017, 8 pages, Amazon Web Services, Inc., retrieved from https://aws.amazon.com/dms/.

Author Unknown, "DBBest Technologies," Month Unknown, 2017, 3 pages, DB Best Technologies, LLC, retrieved from https://www.dbbest.com/.

Author Unknown, "Ispirer," Month Unknown, 2017, 5 pages, Ispirer Systems, LLC, retrieved from https://www.ispirer.com/.

Author Unknown, "Linked Servers (Database Engine)," Oct. 14, 2019, 5 pages, Microsoft, retrieved from https://docs.microsoft.com/en-us/sql/relational-databases/linked-servers/linked-servers-database-engine?view=sql-server-ver15.

Heimbigner, Dennis, et al., "A Federated Architecture for Information Management," ACM Transactions on Office Information Systems, Jul. 1985, 26 pages, vol. 3, No. 3, ACM.

Hwang, San-Yih, "The Myriad Federated Database Prototype," SIGMOD '94 Proceedings of the 1994 ACM SIGMOD International Conference on Management of Data, May 24-27, 1994, 1 page, ACM, New York, New York, USA.

Kache, Holger, et al., "POP/FED: Progressive Query Optimization for Federated Queries in DB2," VLDB '06, Sep. 12-15, 2006, 4 pages, ACM, Seoul, Korea.

Non-Published Commonly Owned U.S. Appl. No. 16/270,575, filed Feb. 7, 2019, 36 pages, Datometry, Inc.

Simitsis, Alkis, et al., "Optimizing Analytic Data Flows for Multiple Execution Engines," SIGMOD '12, May 20-24, 2012, 12 pages, ACM, Scottsdale, Arizona, USA.

Zhang, Mingyi, et al., "Workload Management in Database Management Systems: A Taxonomy," IEEE Transactions on Knowledge and Data Engineering—Manuscript, Month Unknown 2017, 18 pages, IEEE.

Wang, Jinfu, et al., "Anomaly Detection in the Case of Message Oriented Middleware," MidSec '08, Dec. 1-5, 2008, 3 pages, ACM, Leuven, Belgium.

Whitney, Arthur, et al., "Lots o' Ticks: real-time high performance time series queries on billions of trades and quotes," ACM SIGMOD 2001, May 21-24, 2001, 1 page, ACM, Santa Barbara, California, USA.

Antova, Lyublena, et al., "Datometry Hyper-Q: Bridging the Gap Between Real-Time and Historical Analytics," SIGMOD'16, Jun. 26-Jul. 1, 2016, 12 pages, ACM, San Francisco, CA, USA.

Antova, Lyublena, et al., "An Integrated Architecture for Real-Time and Historical Analytics in Financial Services," Month Unknown 2015, 8 pages, San Francisco, CA, USA.

Author Unknown, "46.2. Message Flow," PostgreSQL 9.2.24 Documentation, Chapter 46: Frontend/Backend Protocol, Nov. 9, 2017, 8

(56) References Cited

OTHER PUBLICATIONS pages, The PostgreSQL Global Development Group, retrieved from https://www.postgresql.org/docs/92/static/protocol-flow.html.

Author Unknown, "46.5. Message Formats," PostgreSQL 9.2.24 Documentation, Chapter 46: Frontend/Backend Protocol, Nov. 9, 2017, 11 pages, The PostgreSQL Global Development Group, retrieved from https://www.postgresql.org/docs/9.2/static/protocol-message-formats.html.

Author Unknown, "Greenplum Database: Critical Mass Innovation," Architecture White Paper, Aug. 2010, 17 pages, EMC Corporation, San Mateo, CA, USA.

Author Unknown, "Informatica Data Services," Data Sheet, Month Unknown, 2015, 4 pages, Informatica LLC, Redwood City, CA, USA.

Author Unknown, "Informatica PowerCenter Data Virtualization Edition," Data Sheet, Month Unknown, 2013, 8 pages, Informatica LLC, Redwood City, CA, USA.

Author Unknown, "Introduction to InfoSphere Federation Server," IBM InfoSphere Foundation Tools IBM InfoSphere Information Server, Version 8.7.0, Oct. 1, 2011, 4 pages, IBM.

Author Unknown, "MemSQL Overview," White Paper, Aug. 2018, 4 pages, MemSQL Inc.

Author Unknown, "Microsoft Analytics Platform System," Jan. 2016, 2 pages, Microsoft Corporation.

Author Unknown, "Reference/ipcprotocol," Feb. 13, 2017, 8 pages, retrieved from http://code.kx.com/wiki/Reference/ipcprotocol.

Author Unknown, "Replatforming Custom Business Intelligence," Case Study, Month Unknown 2018, 2 pages, Datometry, Inc.

Author Unknown, "Teradata Data Warehouse—End of Useful Life," Case Study, Month Unknown 2018, 2 pages, Datometry, Inc., retrieved from https://datometry.com/resources/case-studies/replatform-teradata-end-of-useful-life-replatforming-to-cloud/.

Author Unknown, "Teradata Vantage," Data Sheet, Month Unknown 2018, 3 pages, Teradata Corporation, San Diego, CA, USA.

Author Unknown, "The 21st Century Time-series Database," White Paper, Jul. 2016, 10 pages, Kx Systems, Inc.

Author Unknown, "The Denodo Platform 7.0," White Paper, Month Unknown, 2018, 44 pages, Denodo Technologies.

Bear, Chuck, et al., "The Vertica Database: SQL RDBMS for Managing Big Data," MBDS'12, Sep. 21, 2012, 2 pages, ACM, San Jose, CA, USA.

Bornea, Mihaela A., et al., "One-Copy Serializability with Snapshot Isolation Under the Hood," 2011 IEEE 27th International Conference on Data Engineering, Apr. 11-16, 2011, 12 pages, IEEE, Hannover, Germany.

Cecchet, Emmanuel, et al., "Middleware-based Database Replication: The Gaps Between Theory and Practice," SIGMOD'08, Jun. 9-12, 2008, 14 pages, Vancouver, Canada.

Chang, Lei, et al., "HAWQ: A Massively Parallel Processing SQL Engine in Hadoop," SIGMOD'14, Jun. 22-27, 2014, 12 pages, ACM, Snowbird, Utah, USA.

Elnikety, Sameh, et al., "Tashkent: Uniting Durability with Transaction Ordering for High-Performance Scalable Database Replication," EuroSys'06, Apr. 18-21, 2006, 14 pages, ACM, Leuven, Belgium.

Flores, Carlos, et al., "SeDiM: A Middleware Framework for Interoperable Service Discovery in Heterogeneous Networks," ACM Transactions on Autonomous and Adaptive Systems, Feb. 2011, 8 pages, vol. 6, No. 1, Article 6, ACM, New York, NY, USA.

Garland, Simon, "Big Data Analytics: Tackling the Historical Data Challenge," CIOReview, Month Unknown 2014, 3 pages, retrieved from https://data-analytics.cioreview.com/cxoinsight/big-data-analytics-tackling-the-historical-data-challenge-nid-4298-cid-156.html.

Gog, Ionel, et al. "Musketeer: all for one, one for all in data processing systems," EuroSys'15, Apr. 21-24, 2015, 16 pages, ACM, Bordeaux, France.

Gorman, Ciarán, "Columnar Database and Query Optimization," Technical Whitepaper, Mar. 2013, 26 pages, Kx Systems, Inc.

Gray, Jim, et al., "The Dangers of Replication and a Solution," Technical Report—MSR-TR-96-17, SIGMOD '96, Jun. 4-6, 1996, 12 pages, ACM, Montreal, Quebec, Canada.

Gupta, Anurag, et al., "Amazon Redshift and the Case for Simpler Data Warehouses," SIGMOD'15, May 31, 2015-Jun. 4, 2015, 7 pages, ACM, Melbourne, Victoria, Australia.

Hanna, James, "Multi-Partitioned kdb+ Databases: An Equity Options Case Study," Technical Whitepaper, Oct. 2012, 13 pages, Kx Systems, Inc.

Lin, Yi, et al., "Middleware based Data Replication Providing Snapshot Isolation," SIGMOD 2005, Jun. 14-16, 2005, 12 pages, ACM, Baltimore, Maryland, USA.

Non-Published Commonly Owned U.S. Appl. No. 16/542,133, filed Aug. 15, 2019, 70 pages, Datometry, Inc.

Non-Published Commonly Owned U.S. Appl. No. 16/542,140, filed Aug. 15, 2019, 70 pages, Datometry, Inc.

Non-Published Commonly Owned U.S. Appl. No. 16/542,143, filed Aug. 15, 2019, 71 pages, Datometry, Inc.

Non-Published Commonly Owned U.S. Appl. No. 16/542,145, filed Aug. 15, 2019, 71 pages, Datometry, Inc.

Non-Published Commonly Owned U.S. Appl. No. 16/542,146, filed Aug. 15, 2019, 71 pages, Datometry, Inc.

Non-Published Commonly Owned U.S. Appl. No. 16/542,148, filed Aug. 15, 2019, 71 pages, Datometry, Inc.

Non-Published Commonly Owned U.S. Appl. No. 16/599,049, filed Oct. 10, 2019, 54 pages, Datometry, Inc.

Non-Published Commonly Owned U.S. Appl. No. 16/599,055, filed Oct. 10, 2019, 53 pages, Datometry, Inc.

Non-Published Commonly Owned U.S. Appl. No. 16/599,057, filed Oct. 10, 2019, 54 pages, Datometry, Inc.

Non-Published Commonly Owned U.S. Appl. No. 16/599,061, filed Oct. 10, 2019, 53 pages, Datometry, Inc.

Non-Published Commonly Owned U.S. Appl. No. 16/599,064, filed Oct. 10, 2019, 53 pages, Datometry, Inc.

Non-Published Commonly Owned U.S. Appl. No. 16/599,066, filed Oct. 10, 2019, 53 pages, Datometry, Inc.

Non-Published Commonly Owned U.S. Appl. No. 16/599,071, filed Oct. 10, 2019, 53 pages, Datometry, Inc.

Non-Published Commonly Owned U.S. Appl. No. 16/684,785, filed Nov. 15, 2019, 54 pages, Datometry, Inc.

Non-Published Commonly Owned U.S. Appl. No. 16/684,803, filed Nov. 15, 2019, 54 pages, Datometry, Inc.

Non-Published Commonly Owned U.S. Appl. No. 16/684,847, filed Nov. 15, 2019, 54 pages, Datometry, Inc.

Owrang O., M. Mehdi, et al., "A Parallel Database Machine for Query Translation in a Distributed Database System," SAC '86: Proceedings of the 1986 Workshop on Applied Computing, Oct. 1986, 6 pages.

Plattner, Christian, et al., "Ganymed: Scalable Replication for Transactional Web Applications," Middleware '04, Oct. 18-22, 2004, 20 pages, Toronto, Canada.

Pullokkaran, Laljo John, "Analysis of Data Virtualization & Enterprise Data Standardization in Business Intelligence," Working Paper CISL# Oct. 2013, May 2013, 60 pages, Massachusetts Institute of Technology, Cambridge, Massachusetts, USA.

Schlamb, Kelly, "dashDB: Self-service data warehousing in the cloud at any scale," DB2 Tech Talk, Jun. 25, 2015, 55 pages, IBM Corporation.

Soliman, Mohamed A., et al., "Orca: A Modular Query Optimizer Architecture for Big Data," SIGMOD'14, Jun. 22-27, 2014, 12 pages, ACM, Snowbird, Utah, USA.

* cited by examiner

METHOD AND SYSTEM FOR WORKLOAD MANAGEMENT FOR DATA MANAGEMENT SYSTEMS

This present application is a continuation application of U.S. patent application Ser. No. 15/250,887, filed Aug. 29, 2016, now published as US Patent Publication 2017/0063936. U.S. patent application Ser. No. 15/250,887 claims the benefit of US Provisional Patent Application No. 62,210,896, filed on Aug. 27, 2015, and entitled "METHOD AND SYSTEM FOR WORKLOAD MANAGEMENT FOR DATA MANAGEMENT SYSTEMS." U.S. patent application Ser. No. 15/250,887, now published as US Patent Publication 2017/0063936 and US Provisional Patent Application 62,210,896 are incorporated herein by reference.

FIELD

Embodiments of the present invention relate to database systems.

BACKGROUND

Database management systems may be configured to serve as multiple clients. Each client typically maintains a connection to a particular database management system, and database requests are sent over said connection for processing by the database management system. Each database management system may be configured to support a maximum number of simultaneous client connections. If the maximum number of concurrent client connections is exceeded, then a request for a new client connection will be denied.

SUMMARY

Invention is enterprise software that manages workloads submitted by client applications to one or more data management systems ("DMS"), such as a relational database management system. Invention increases scalability and availability of the data management systems by providing detailed admission policies, scheduling primitives, and means of control for resource consumption.

In one embodiment, the invention can be used to achieve virtual scalability in a DMS with hard-coded limit on the number of concurrent connections. When a large number of concurrent connection requests are attempted to DMS, the DMS might refuse accepting new connections if the number of already accepted connections has reached the hard-coded limit. This could result in clients unsuccessfully attempting to re-connect to the DMS. The invention is used to virtually allow a large number of concurrent client connections to access the DMS, beyond what the DMS typically permits. This is enabled by pooling a large number of incoming client connections into multiple pools, while using a smaller number of outgoing physical connections to actually communicate with the DMS. Each pool has a backlog of client Requests received from different clients. After processing a given Request is complete, a Request from the backlog is granted access to the DMS. From client-side perspective, a large number of concurrent clients are allowed to access the DMS, while from the DMS perspective, the limit on the number of concurrent connections is still enforced even though the actual Requests might belong to a number of clients exceeding the DMS concurrency limits.

In one embodiment, the invention can be used to achieve workload balancing across replicas of the same DMS. A connection pool is configured to route incoming traffic to a gateway replica in a cluster of replicas. The invention maintains active connections to the different gateways representing the replicas in the cluster. When a Request is received, a particular replica can be chosen based on different criteria including round-robin and random choice criteria. For example, if a random choice criterion is used, a replica is chosen at random each time to process a Request received from a given client. This achieves load balancing across replicas by randomly distributing the client workload across different DMS instances.

In one embodiment, the invention is configured to route client Requests to different DMS replicas while adapting to workload and client characteristics. For example, Requests could be routed based on client address, geographical location, client priority and type of Request. For example, Requests in a transactional workload typically require small processing times. These requests could be routed to replicas with limited processing power. On the other hand, Requests with deep analytical operations typically require heavy processing. There Requests are routed to replicas with more processing power.

In one embodiment, the invention is used to achieve fault tolerance in read-only DMS replicas, when the DMS lacks fault tolerance capabilities. When a connection pool is configured to route traffic to a DMS replica in a cluster of replicas, the invention detects that the connection to a particular replica has failed because of replica failure (e.g., disk failure or network inaccessibility). The invention automatically excludes the failed replicas from processing any further Requests. Other configured replicas in the cluster are used to substitute the failed replica. A stand-by replica could also be used to replace the failing replica.

In one embodiment, the invention allows system administrators to monitor the status of different connection pools and DMS gateways. This includes getting information and aggregated statistics on the number of active connections, size of backlogs, long-lived client Requests, average processing time in each DMS instance. Performance analysis of DMS instances and flagging potential bottlenecks are possible based on this information. For example, system administrators can detect that the average Request processing time of a particular DMS instance is too large, and hence choose to replicate the instance by adding one or more additional instances to achieve better load balancing and response times.

In one embodiment, the invention allows system administrators to gain exclusive access to the DMS for maintenance purposes. The invention is configured to route all administrator Requests through a special pool with exclusive access rights on the DMS gateway system. This guarantees all client connections are idle for the duration of processing a given administrator Request. This allows maintenance and management requests to be processed while other client requests are queued without affecting the availability of the DMS. The clients do not lose their active connections to the DMS. The DMS becomes virtually available and it responds to clients Requests as soon as the ongoing administrator Request is complete.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features.

Accordingly, this description of the invention is set forth without any loss of generality to, and without imposing limitations upon, the invention.

Broadly, embodiments of the present invention disclose techniques and systems controlling access to database management system (DMS).

Figure 1:
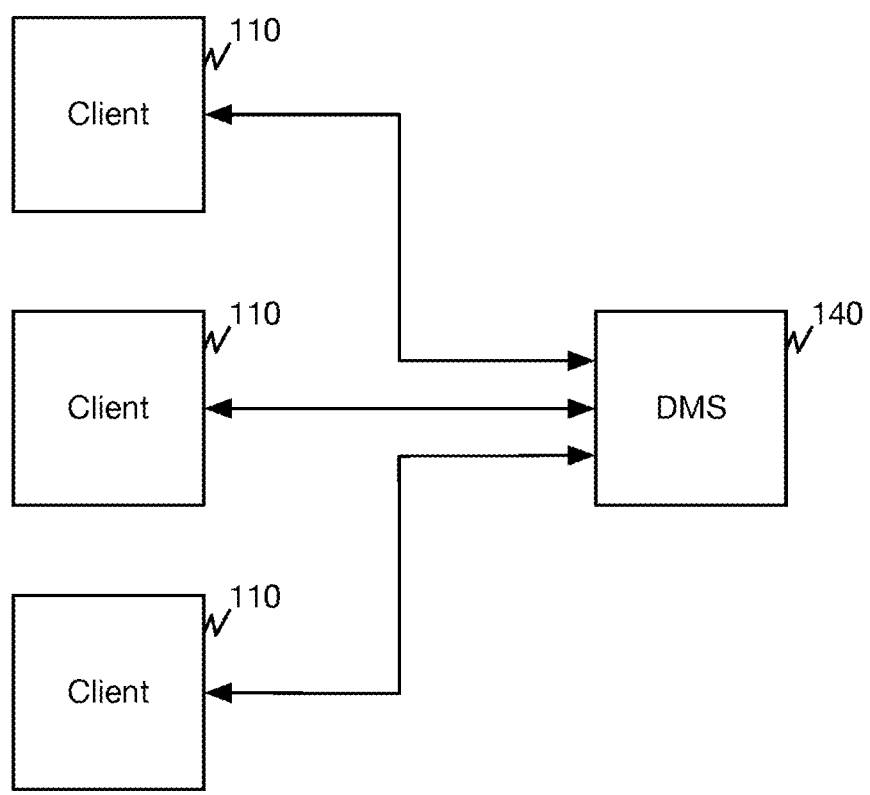
FIG. 1 schematically illustrates how clients typically connect to a database management system (DMS).

Before describing the invention, it may be useful to review some basic concepts around the deployment of applications and data management systems as outlined in FIG. 1.

A client application ("Client") (110) establishes one or more connections with DMS (140) and communicates a workload consisting of commands ("Request") to DMS, then receives data messages ("Result") that it process. After processing of the workload is complete, the client shuts down the connection. Depending on the application logic, the workload can be an individual command or, more typically, a sequence of commands. If the workload consists of multiple commands, the session is considered "idle" between the time results for one command are returned and a new request is submitted.

The establishing of a connection as well as the subsequent communication may be conducted using connector libraries typically provided by the vendor of DMS or third parties. Typical, embodiments of such connectors are OBDC or JDBC libraries.

In the following, the term "Client" is used in a generic way to encompass a wide variety of different client applications; client applications may differ in workloads submitted, results consumed, etc.

In the section "Application Scenarios" a variety of problems arising from this way of deploying Client and DMS are illustrated in detail.

Figure 2:
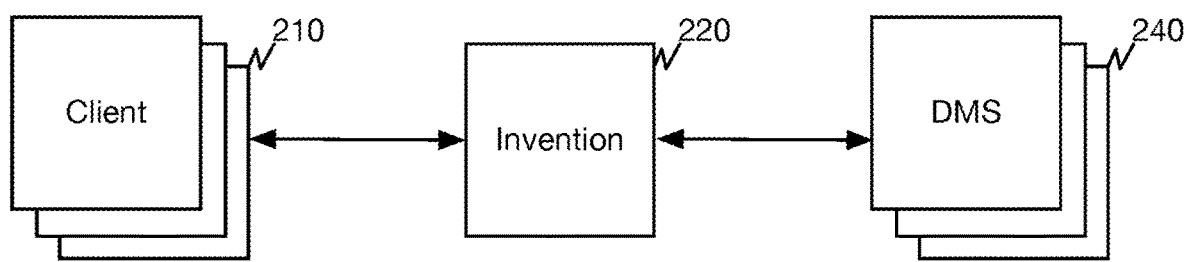
FIG. 2 shows a deployment scenario where claims connect to a DMS via an intermediate workload manager (Invention), in accordance with one embodiment of the invention.

In contrast, FIG. 2 depicts a deployment of DMS and instances of Client using the invention. Instances of Client (210) now connect to the Invention (220) instead of DMS (240), and Invention connects to DMS. Invention manages connection and workload requests as detailed below. Section "Application Scenarios" illustrates various use cases and their benefits.

Figure 3:
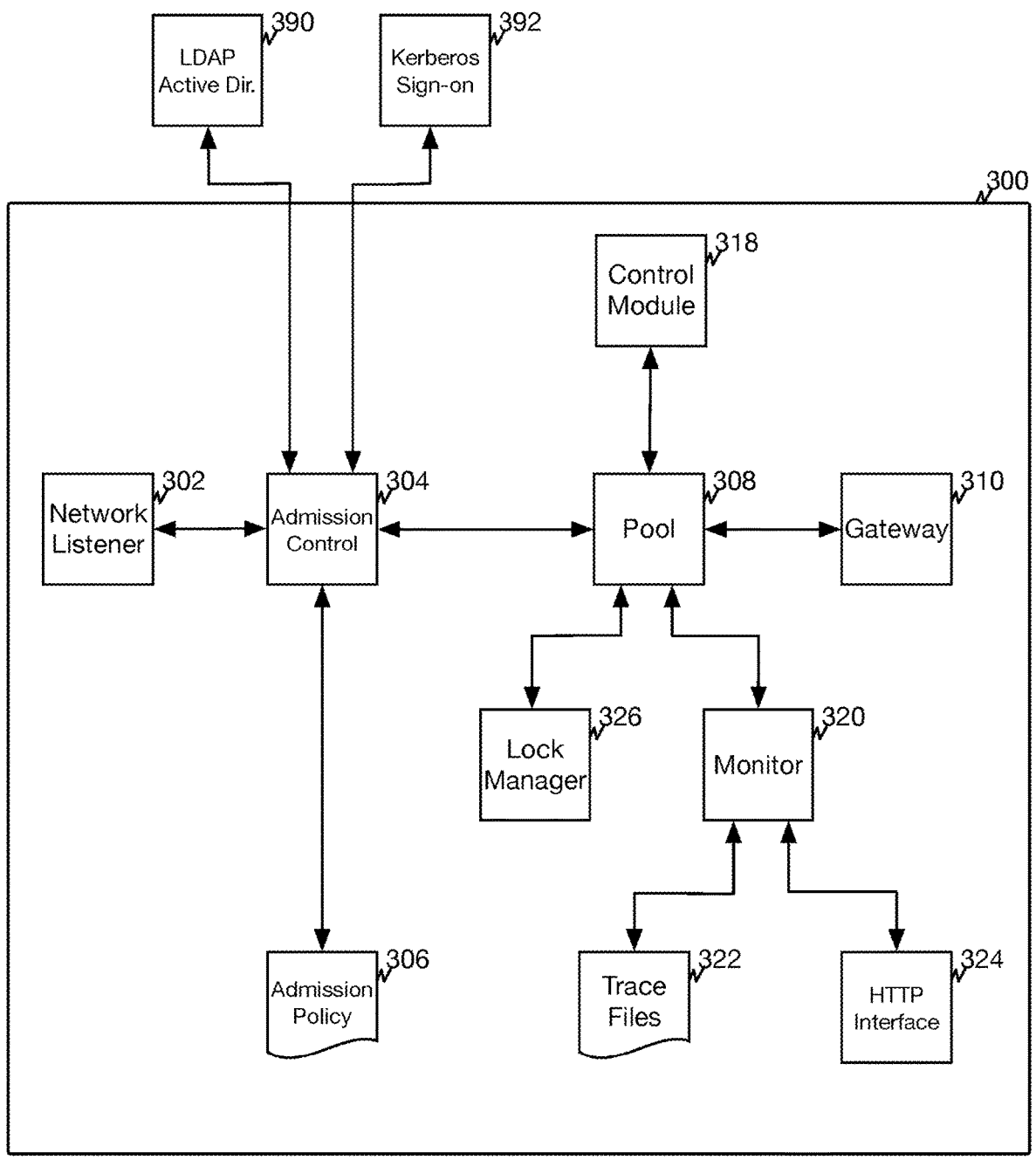
FIG. 3 shows a high-level block diagram of the components of the inventive workload manager, in accordance with one embodiment.

FIG. 3 is a diagram illustrating an embodiment of Invention (300). It consists of the following components. Network Listener (302) that accepts incoming connection requests using standard network protocols, such as TCP/IP. Network Listener routes the connection to a module ("Admission Control") (304) that selects and applies a policy ("Admission Policy") (306) to determine (i) the method of authentication used for the connection, and (ii) the resource pool ("Pool") and gateway ("Gateway") to be used in routing the connection.

Admission Policy is selected based on a number of criteria (306) that may include any of the following: (i) identity of user of incoming request, i.e., login; (ii) database or data container Client wants to connect to; (iii) IP address where connection request was originated from, including masking of the IP address to consider only parts of the address; (iv) name of the application; variety of other criteria based on parameters transmitted at the time of the connection request may be used to select Admission Policy.

The validity of Admission Policy can be either general, i.e., always valid, or limited by ranges or patterns of dates and/or times.

Admission Control may be configured to perform authentication, including (i) authentication via locally stored passwords using standard encryption such as SHA-1, MD5, etc., (ii) integrated security in the form of LDAP (390), including Active Directory, or (iii) Single-Sign On (392) using Kerberos or (iv) other standard authentication protocols.

Invention manages one, or more typically, a multitude of pools (308). Pool controls the number of concurrent connections from Invention to DMS as well as the traffic transmitted over these connections at any given time. Routing incoming connections to different pools effectively divvies up DMS's resource bandwidth between different groups of connections, establishes priorities between different instances of Client, and accomplishes scalability, availability and traffic optimization objectives as detailed in "Application Scenarios" below. Pool also controls life-cycle management of connections through timeouts concerning idle sessions and active transactions, see Workflow details below.

Pool is characterized by (i) the number of concurrent connections an instance of Pool permits to DMS ("Capacity"), (ii) number of concurrently active statements ("Active Slots"), usually significantly lower than Capacity, and (iii) number of connection requests that are waitlisted ("Backlog").

Pool routes the connection request and subsequent commands to Gateway (310) that specifies the connection parameters for the connection to the DMS.

Control Module (318) provides a means to administrators to affect Pool or Connection via language extensions ("Control Language") to terminate, pause, and activate Connection or Pool. Control Language contains also language primitives for modifying any configuration detail in the system including configuration details of Pool, number and configuration details of Policy, number and configuration details of Gateway, etc.

Tracing facility (320) monitors Connection and makes detailed observations available for external consumption via files (322), HTML over HTTP (324) or other formats. Observations include timing of individual steps of progress of Connection such as time when request was received, time spent waiting for admission to Pool, full transcript of Request, time Request was submitted to DMS, time when first data of Result was received, time Request was completed successfully, or error received, etc.

Lock Manager (326) provides means to acquire shared/exclusive locks on any resource in Invention, including locks for mutually exclusive or shared access ("Access Lock") to DMS gateways, see below for details.

Detailed Control Flow

Figure 4:
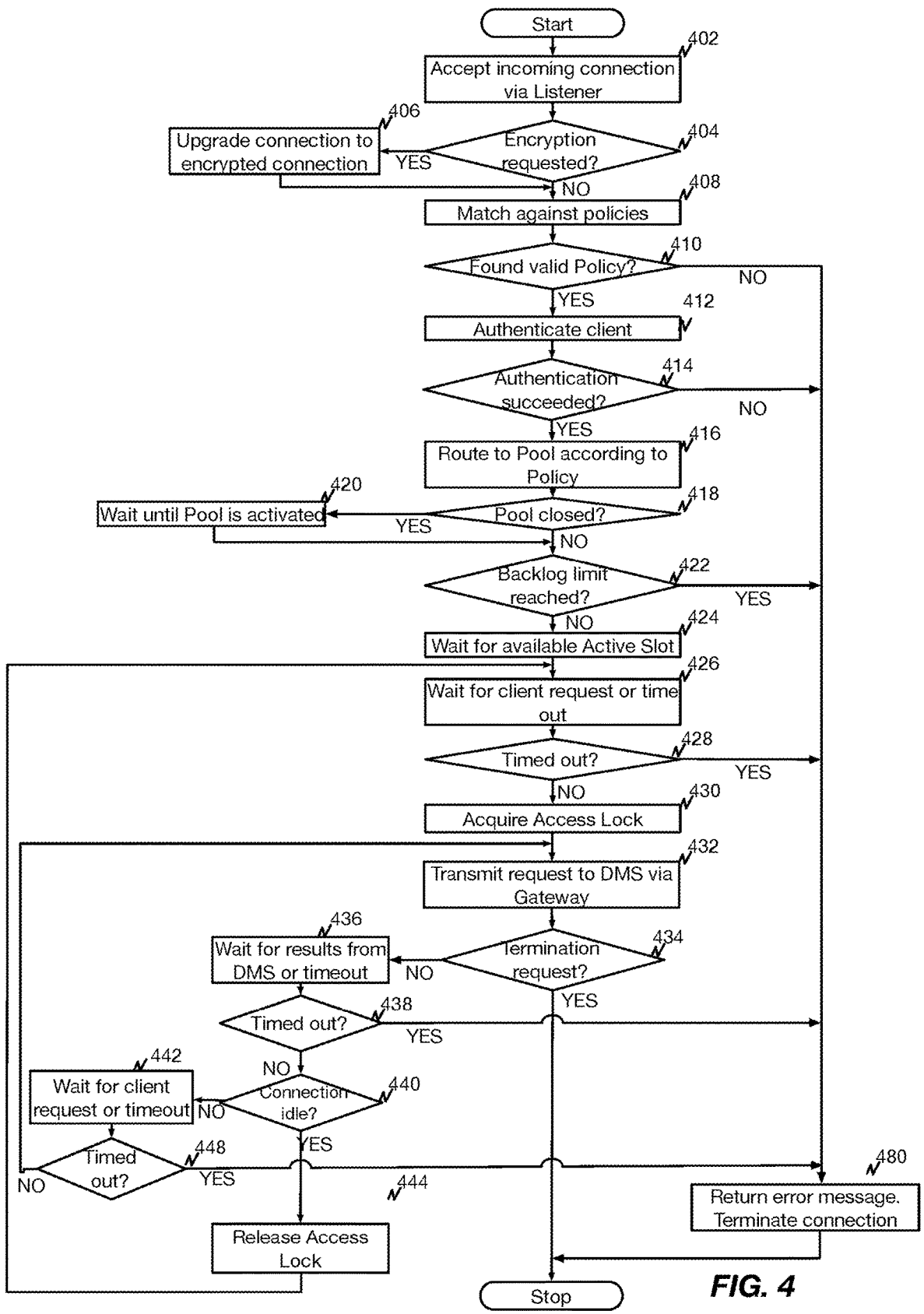
FIG. 4 shows a flowchart of how connections and establishing commands processed, in accordance with one embodiment of the invention.

The following describes how connections are established and commands are processed as detailed in flowchart in FIG. 4.

Invention accepts incoming connection request (402) via standard network protocol such as TCP/IP using Network Listener (302). If client requests connection to be encrypted (404), Connection is upgraded (406) using any standard encryption technology such as Transport Layer Security (TLS) or Secure Sockets Layer (SSL).

Connection is then matched against available policies (408) using a variety of criteria as discussed above. Policies are matched in priority order as defined by the administrator. The first matching policy ("Policy") is used. If no policy matches the search criteria (410) an error message is returned to the client and the connection is terminated (480).

Based on Policy, an authentication method is determined and Client is either directly authenticated or, in case of pass-through authentication, authentication is deferred to DMS once connection is established (412). If immediate authentication is required according to Policy but does not succeed (414), an appropriate error message is returned to Client and Connection is terminated (480).

Otherwise, Policy determines Pool through which all communication will be conducted (416). If Pool is closed, i.e., does not accept new connections at this time (418) Connection is held in waiting pattern until Pool is activated again (420). If the limit on Backlog, as configured by administrator, is reached (422) appropriate error message is returned to Client and Connection is terminated (480).

Otherwise, Connection waits for Active Slot to become available (424). Connection waits for first request from Client or timeout to occur (426). If timeout occurred (428), appropriate error message is returned to Client and Connection is terminated (480).

Otherwise, Access Lock is acquired (430). Once granted, Request is transmitted to DMS via Gateway (432). If Request is a request to terminate Connection (434), indicating the end of the workload, Connection is shut down and workflow terminates.

Otherwise, Connection waits for Result and forwards it on to Client (436). If Result is not completely received within a configured timeout (438), appropriate error message is returned to Client and Connection is terminated (480).

Otherwise, if Connection is idle (440), i.e., no transactions are pending, Access Lock is released (444) and control flow continues with waiting for client requests (426).

If Connection is not idle (440), Access Lock remains held and Connection waits for next request from Client (442). If timeout occurred (448), appropriate error message is returned to Client and Connection is terminated (480). Otherwise, control flow continues at (432).

Instead of terminating the connection from Invention to DMS, Invention may retain unused connections and re-use them later in order to avoid a potential time penalty for establishing and destroying of connections to DMS.

Application Scenarios

The following are detailed descriptions of application scenarios that exemplify how an embodiment of the invention can be used. The scenarios are chosen to each illustrate a specific scenario. In practice the scenarios presented will widely overlap.

Scenario 1: Scalable Connection Management

Typically, a multitude of clients may connect simultaneously to DMS. As DMS has only limited resources such as memory, CPU capacity, I/O bandwidth, etc. the system's performance declines with increasing number of simultaneous connections. Depending on the types of requests, i.e., the workloads of individual clients, the DMS's resources may get depleted to the point where new connections cannot be made and existing workloads cannot finish or finish within reasonable time. In this situation, the system is considered unavailable or "down" with severe ramifications for the users: applications are denied access and business processes are disrupted, existing connections to the database may get starved of resources and prevented from making any progress, and even a restart of the entire DMS may be needed, requiring significant intervention from IT staff. Typically, the maximum number of connections presents a hard limit that is configured at system start in DMS. It is generally desirable to keep the limit on concurrent connections low—typically in the low hundreds—to avoid wasting resources such as memory unnecessarily and take into account limitation of the system's scalability. Depending on the characteristics of the workloads it may be desirable to have no more than a fraction of the connections submit concurrently requests to be processed in parallel. As the number of connections cannot be controlled by the DMS or operators of the DMS but depends solely on the number of clients or applications the lack of control and the prospect of system failures in case of overload render the DMS as unstable or lacking in robustness.

Using Invention makes operating applications and DMS scalable and safe as follows. The maximum number of connections DMS is configured to handle is not reached nor can it be exceeded. Even when a large number of connection attempts are submitted to Invention no connections are refused and processing in Client is not interrupted or disturbed. The number of truly concurrently submitted requests is controlled by the capacity of Access Lock. This gives administrators fine-grain control over the degree of actual concurrency of processing in DMS, yet, makes DMS appear scalable and available at any point in time.

Scenario 2: Virtual Single-User Mode for Maintenance Operations

A number of maintenance operations in DMS require that no instance of Client is performing concurrent operations, i.e., all connections be idle. This is typically accomplished by shutting down DMS and restarting it in a restricted mode that allows only a single user to connect. This makes DMS only accessible to the administrator to perform the maintenance operation. Once the operation is complete, DMS is shut down again and restarted in regular multi-user mode.

By configuring (i) a pool through which administrator connections are routed and (ii) Access Lock to offer exclusive access for this pool, Invention implements a admission control mechanism, that enables administrator to gain exclusive access with the guarantee that any concurrent connection is idle for the duration of any operation submitted via the administrator pool ("Virtual Single-user Mode"). As a result, the management operations can be executed, even though they require restricted access, without compromising the overall availability of the system or causing disruption to clients and business processes.

Scenario 3: Tracing and Auditing

Pool may be configured to retain detailed information about timing of event at a finer resolution than workload, i.e., times of individual messages being exchanged between Client and DMS. Timing and authentication information is made available for external consumption through files or API's such as HTTP. The information logged can serve as audit information detailing exact information about the requester and nature and content of individual requests. Another use case for the information is detailed analysis of the performance characteristics of DMS typically used for trouble-shooting and sizing and capacity planning of DMS. Timing information includes time of arrival of requests, identity of application or user, content of request, time request is queued in Invention, time request is submitted to DMS, time first results are obtained, time request is complete or encountered error condition, etc.

Scenario 4: Multi-DMS Routing and Load-Balancing

It is often desirable to route connections to different copies of DMS for purposes of load-balancing or isolating of workloads. Pool can be configured to route connections to different gateways based on a multitude of criteria such as round-robin or based on load profiles of individual DMS instances. Typical configurations include routing of all write access to one instance and routing of all read-only access across a cluster of replicas.

To enhance understanding of the present invention, consider the example of an insurance company operating globally that maintains insurance and claims data in a DMS. The data is accessed by a large number of client applications across all departments. During a typical business day, claims data is reported by field agents, rates and pricing is requested by sales representatives, and regulatory reporting is performed at the end of the business day. Cients' interaction with the DMS is executed through applications that connect to the DMS, run on or more database queries or update existing records, then terminate the connection. A typical connection may last anywhere from seconds to hours, the actual queries or commands are usually in the order of seconds. In addition, a variety of user groups such as executives that access the DMS occasionally—but at high priority—during planning or board meetings exist across the enterprise. For the above example, the following use cases may be realized:

1. Traffic Management

The DMS is provisioned to accommodate a certain capacity of concurrent connections, e.g., 200 connections. However, during a surge pattern such as a natural disaster, the number of requests to file claims and/or check insurance policies may exceed regular traffic by a multiple. As a result, client applications may crash or error out and show behavior similar to that of an overloaded wireless telephone network: repeated connection attempts only increases the contention on the DMS but actual throughput is often diminished. In extreme cases, the DMS my run out of resources and shut down completely leading to catastrophic results at the business level.

Using Invention, incoming connection request are queued until capacity on the DMS frees up and first-come-first-served order is preserved. Applications do not crash or error out, instead may experience short delays but are fully functional.

2. Priority Routing

During certain days of the week as well as certain times of the day, overall workload may be heavier than at other times leading to generally slower response times.

Using Invention groups of applications or users can be assigned different priorities, e.g., connection requests by executives can be given priority over other requests.

3. Load-Balancing

To overcome throughput limitations of a DMS, multiple replicas with identical data loaded may be used. Invention can load-balance between the different systems according to different policies including round-robin where the next incoming connection is assigned to the next DMS according to a predefined sequence, or uniform balancing where connections are assigned a DMS chosen randomly. Round-robin is generally considered a fair scheduling tactic, however, uniform distribution may outperform round-robin as it is not susceptible to accidental traffic patterns that might end up taxing one instance harder than others.

4. Data Sharding—Access Policy

In many areas of business, including the insurance business, regulation requires certain information to be retained within the country of business, e.g., data about insurance policies sold in Germany must not be stored or processed outside of Germany. Therefore, the company must maintain data centers with separate DMS's for different geographies. Invention may be configured to route connections according to their country of origin to the appropriate DMS. This simplifies the setup of the client applications and avoids that clients accidentally, or willfully, access data that is outside of the corresponding jurisdiction.

5. Data Sharding—Performance Optimization

For an additional scenario for sharding consider departmental policies where certain user groups have different performance requirements when accessing data. For example, insurance agents who access the DMS concurrently need up-to-date pricing to present customers with appropriate quotes. End of day reporting for regulatory purposes, however, requires consolidated data and is accessed only by a few controllers. This presents an cost optimization opportunity for IT: by using Invention, agents' request can be routed to a high-performance/high-throughput instance of DMS, whereas end-of-day reporting is routed to a much more cost-effective replica of the DMS.

6. Operations and Maintenance

Occasionally, the DMS may need to be taken off-line for emergency maintenance such as replacement of hardware, restart after power failure, etc. Some of these operations require that no user connections are currently active on the DMS, others may require complete shutdown and restart of the DMS. Invention enables queuing and buffering of incoming request so DMS can be taken off-line, maintained, and restarted without affecting users' applications. Even complete shutdown and restart of the underlying DMS which may take 10's of seconds does not result in interruptions of clients' connections.

Besides operational benefits such as enhanced throughput or up-time, Invention's benefits extend also to the client applications: Using Invention, a single-system view is preserved, i.e., client applications are unaware of the different underlying systems but connect to only one central point that is Invention. The benefit of a single-system view is the decoupling of front-office, i.e., client applications and back-office, i.e., IT department: the additional flexibility allows both sides to deploy software more flexibly because changes on either side do not require re-wiring/re-configuration of systems but are mitigated and optimized by Invention.

Invention can be used to supplement an existing DMS with workload management and extends workload management capability across multiple instances of a DMS. Invention enhances the scalability of a DMS often by a significant multiple of what DMS provides natively. By boosting the availability of DMS through Virtual Single-user Mode or temporary closure of pools, DMS—which would otherwise not be considered highly available—can now be used in mission-critical application scenarios. In addition, Invention provides a wide array of utilities and mechanisms to simplify deployment of applications and DMS by (i) giving administrators better visibility into traffic and traffic patterns between Client and DMS, and (ii) providing controls that put administrators in charge.

Figure 5:
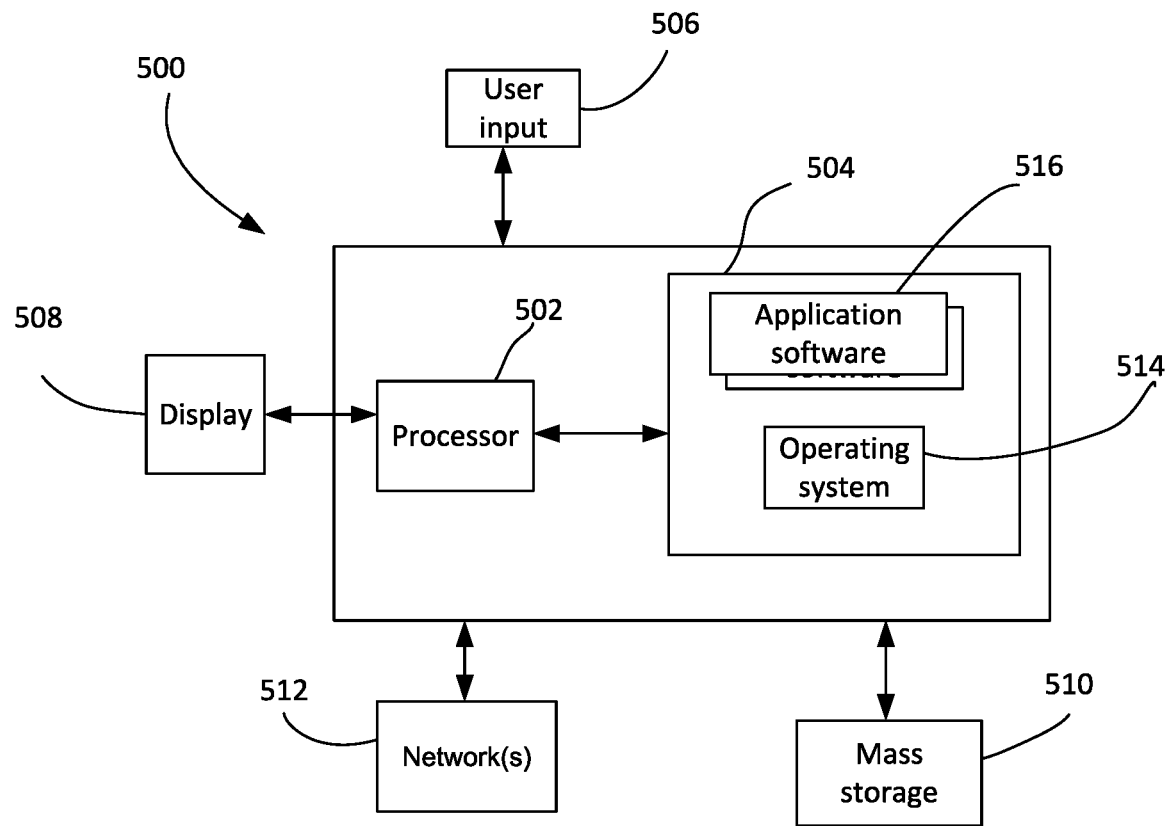
FIG. 5 shows a high-level block diagram of exemplary hardware that may be used to implement workload manager, in accordance with one embodiment.

FIG. 5 shows an example of hardware 800 that may be used to implement Invention, in accordance with one embodiment. The hardware 500 may include at least one processor 502 coupled to a memory 504. The processor 502 may represent one or more processors (e.g., microprocessors), and the memory 504 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware, e.g. any cache memory in the processor 502, as well as any storage capacity used as a virtual memory, e.g., as stored on a mass storage device.

The hardware also typically receives a number of inputs and outputs for communicating information externally. For interface with a user or operator, the hardware may include one or more user input devices 506 (e.g., a keyboard, mouse, etc.) and a display 508. For additional storage, the hardware 800 may also include one or more mass storage devices 510, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 512 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 712 and each of the components, as is well known in the art.

The hardware 500 operates under the control of an operating system 514, and executes application software 816 which includes various computer software applications, components, programs, objects, modules, etc. to perform the techniques described above.

In general, the routines executed to implement the embodiments of Invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for sharing a limited number of database connections with a larger number of clients, the method comprising:
    at a pooling component: maintaining a plurality of incoming connections to a plurality of databases to process queries from a plurality of N clients, wherein N is a number;
    defining a plurality of M queuing pools, each queuing pool associated with at least one database and providing one or more outgoing connections to the associated database, wherein:
        M is a number smaller than N; and
        each queuing pool is characterized by a number of concurrent connections an instance of the pool permits to the associated database;
    selecting a queuing pool to store queries for each incoming connection from the plurality of clients, wherein at least one queuing pool is used to store queries from at least two different clients, said queuing pools used to reduce a number of connections to the plurality of databases by requiring the databases to have connections with the smaller number of M queuing pools rather than the larger number of N clients;
    forwarding queries from the queuing pools to the databases associated with the queuing pools; and
    providing responses to the clients based on responses that the databases provide to the forwarded queries.

2. The method of claim 1 further comprising:
    storing requests that are for a particular database and that are received from two different clients through two different incoming connections in a particular queuing pool; and forwarding the stored requests through two concurrent outgoing connections to the particular database for processing.

3. The method of claim 2 further comprising trace monitoring each incoming connection to identify two or more of: a time when a request was received, time spent waiting for admission to a pool, a transcript of the request, a time when first data pursuant to the client database request is received, and a time when a client database request is completed.

4. The method of claim 1, wherein at least one particular queuing pool is associated with two or more databases.

5. The method of claim 4 further comprising performing a load balancing operation at the particular queuing pool to distribute queries for a plurality of incoming connections from a plurality of clients among the two or more databases.

6. The method of claim 1, wherein the pooling component routes each incoming client connection to a queuing pool based on a policy that associates each queuing pool with a set of criteria to match to the incoming connections.

7. The method of claim 1, wherein each queuing pool limits a number of concurrent connections permitted to the pool's associated database.

8. The method of claim 1, wherein each queuing pool limits a number of connection requests that can be waitlisted within the queue.

9. The method of claim 1 further comprising providing a control module configured to allow administrators to configure each pool.

10. The method of claim 1, wherein at least one particular queuing pool limits a number of concurrent connections to its associated database to a maximum number, wherein a number of incoming connections assigned to the particular queuing pool is greater than the maximum number, wherein a number of concurrent outgoing connections from the particular queuing pool to the associated database is smaller than the maximum number.

11. A non-transitory machine readable medium storing a program which when executed on set of processing units of a host computer shares a limited number of database connections with a larger number of clients, the program comprising a set of instructions for:

maintaining a plurality of incoming connections to a plurality of databases to process queries from a plurality of N clients, wherein N is a number;

defining a plurality of M queuing pools, each queuing pool associated with at least one database and providing one or more outgoing connections to the associated database, wherein:
    M is a number smaller than N; and
    each queuing pool is characterized by a number of concurrent connections an instance of the pool permits to the associated database;

selecting a queuing pool to store queries for each incoming connection from the plurality of clients, wherein at least one queuing pool is used to store queries from at least two different clients, said queuing pools used to reduce a number of connections to the plurality of databases by requiring the databases to have connections with the smaller number of M queuing pools rather than the larger number of N clients;

forwarding queries from the queuing pools to the databases associated with the queuing pools; and providing responses to the clients based on responses that the databases provide to the forwarded queries.

12. The non-transitory machine readable medium of claim 11, wherein the program further comprises sets of instructions for:

storing requests that are for a particular database and that are received from two different clients through two different incoming connections in a particular queuing pool; and forwarding the stored requests through two concurrent outgoing connections to the particular database for processing.

13. The non-transitory machine readable medium of claim 12, wherein the program further comprises a set of instructions for trace monitoring each incoming connection to identify two or more of: a time when a request was received, time spent waiting for admission to a pool, a transcript of the request, a time when first data pursuant to the client database request is received, and a time when a client database request is completed.

14. The non-transitory machine readable medium of claim 11, wherein the program further comprises a set of instructions for routing each incoming client connection to a queuing pool based on a policy that associates each queuing pool with a set of criteria to match to the incoming connections.

15. The non-transitory machine readable medium of claim 11, wherein each queuing pool limits a number of concurrent connections permitted to the pool's associated database.

16. The non-transitory machine readable medium of claim 11, wherein each queuing pool limits a number of connection requests that can be waitlisted within the queue.

17. The non-transitory machine readable medium of claim 11, wherein the program further comprises a set of instructions for providing a control module configured to allow administrators to configure each pool.

18. The non-transitory machine readable medium of claim 11, wherein at least one particular queuing pool limits a number of concurrent connections to its associated database to a maximum number, wherein a number of incoming connections assigned to the particular queuing pool is greater than the maximum number, wherein a number of concurrent outgoing connections from the particular queuing pool to the associated database is smaller than the maximum number.

* * * * *